(12) United States Patent
Hennecke et al.

(10) Patent No.: US 11,387,592 B2
(45) Date of Patent: Jul. 12, 2022

(54) CHARGING CONNECTION ELEMENT OF A VEHICLE

(71) Applicant: Bayerische Motoren Werke Aktiengesellschaft, Munich (DE)

(72) Inventors: Joerg Hennecke, Haar (DE); Martin Peteratzinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 59 days.

(21) Appl. No.: 16/977,518

(22) PCT Filed: Feb. 14, 2019

(86) PCT No.: PCT/EP2019/053625
§ 371 (c)(1),
(2) Date: Sep. 2, 2020

(87) PCT Pub. No.: WO2019/174845
PCT Pub. Date: Sep. 19, 2019

(65) Prior Publication Data
US 2021/0006007 A1 Jan. 7, 2021

(30) Foreign Application Priority Data

Mar. 15, 2018 (DE) ...................... 10 2018 203 967.4

(51) Int. Cl.
*H01R 13/74* (2006.01)
*H01R 13/52* (2006.01)
(Continued)

(52) U.S. Cl.
CPC .......... *H01R 13/5202* (2013.01); *B60L 53/16* (2019.02); *H01R 13/74* (2013.01); *H01R 2201/26* (2013.01); *H02J 7/0045* (2013.01)

(58) Field of Classification Search
CPC ........................... H01R 13/5202; H01R 13/74; H01R 2201/26; B60L 53/16; B60L 53/00; B60L 53/10; B60L 53/18; H02J 7/0045
See application file for complete search history.

(56) References Cited

U.S. PATENT DOCUMENTS 5,458,496 A * 10/1995 Itou ........................ B60L 53/65
439/348
RE37,776 E * 7/2002 Foltz .................... B67D 7/0401
220/203.02
(Continued)

FOREIGN PATENT DOCUMENTS

CN 103359186 A 10/2013
CN 105576740 A 5/2016
(Continued)

OTHER PUBLICATIONS

English Translation of Chinese-Office Action issued in Chinese Application No. 201980014071.8 dated May 6, 2021. (8 pages).
(Continued)

*Primary Examiner* — Renee S Luebke
*Assistant Examiner* — Milagros Jeancharles
(74) *Attorney, Agent, or Firm* — Crowell & Moring LLP

(57) ABSTRACT

The invention relates to a charging connection element (1) of a vehicle (10), for connection to a charging apparatus, comprising a charging socket (2) for receiving electrical connectors (14), and comprising a sealing element (3) for sealing off the charging socket (2) from other components of the vehicle (10), wherein the charging socket (2) has a first latching element (4) and the sealing element (3) has a second latching element (5), wherein the first latching element (4) and the second latching element (5) can be latched relative to one another in a large number of different latching positions in order to prevent the charging socket (2) and the sealing element (3) from becoming detached, and wherein
(Continued)

different distances between the charging socket (2) and the sealing element (3) are defined by the different latching positions.

10 Claims, 3 Drawing Sheets

(51) Int. Cl.
*B60L 53/16* (2019.01)
*H02J 7/00* (2006.01)

(56) References Cited

U.S. PATENT DOCUMENTS

| | | | |
|---|---|---|---|
| 9,597,968 B2 * | 3/2017 | Schoener | H01R 13/5213 |
| 2003/0109166 A1 * | 6/2003 | Ookura | H01R 13/5202 |
| | | | 439/372 |
| 2011/0306223 A1 | 12/2011 | Bauer | |
| 2012/0295460 A1 * | 11/2012 | Ichio | H01R 13/74 |
| | | | 439/205 |
| 2013/0249486 A1 | 9/2013 | Eberle | |
| 2013/0257074 A1 | 10/2013 | Eberle et al. | |
| 2015/0042275 A1 * | 2/2015 | Schoener | B60L 53/14 |
| | | | 439/271 |
| 2015/0274010 A1 * | 10/2015 | Roth | F16J 15/025 |
| | | | 296/97.22 |
| 2016/0121744 A1 | 5/2016 | Meini et al. | |
| 2016/0244104 A1 * | 8/2016 | Kuhm | B05C 21/005 |
| 2016/0344130 A1 | 11/2016 | Thurau et al. | |
| 2018/0019536 A1 | 1/2018 | Moseke | |
| 2018/0145442 A1 * | 5/2018 | Sanchez Patino | B29C 45/1671 |
| 2018/0186305 A1 * | 7/2018 | Kanie | F16B 21/075 |
| 2020/0298717 A1 * | 9/2020 | Herold | B60K 15/05 |
| 2020/0386314 A1 * | 12/2020 | Ventallo | B60J 10/24 |

FOREIGN PATENT DOCUMENTS

| | | |
|---|---|---|
| CN | 106335403 A | 1/2017 |
| CN | 107206911 A | 9/2017 |
| DE | 10 2010 023 784 A1 | 12/2011 |
| DE | 10 2012 102 419 A1 | 9/2013 |
| DE | 10 2013 206 855 A1 | 10/2014 |
| EP | 2 525 443 B1 | 1/2014 |

OTHER PUBLICATIONS

International Search Report (PCT/ISA/210) issued in PCT Application No. PCT/EP2019/053625 dated May 10, 2019 with English translation (five pages).
German-language Written Opinion (PCT/ISA/237) issued in PCT Application No. PCT/EP2019/053625 dated May 10, 2019 (six pages).
German-language Search Report issued in German Application No. 10 2018 203 967.4 dated Jan. 3, 2019 with partial English translation (13 pages).

* cited by examiner

CHARGING CONNECTION ELEMENT OF A VEHICLE

BACKGROUND AND SUMMARY OF THE INVENTION

The present invention relates to a charging connection element of a vehicle. The charging connection element is used to connect the vehicle to a charging apparatus. The vehicle is herein in particular an electric vehicle or a plug-in hybrid. Furthermore, the invention relates to such a vehicle comprising a charging connection element.

The prior art discloses a charging socket which is designed to be connected to a charging plug. Such charging sockets are fixed to a vehicle and thus permit the charging of a vehicle-mounted battery. For example, such a charging socket is known from EP 2 525 443 B1. To provide a charging socket on the vehicle, sealing of said socket with respect to the vehicle body is necessary. To this end, for example, DE 10 2012 102 419 A1 discloses a charging shell which is sealed off with respect to the charging socket via a seal. In an alternative application, the charging socket, together with the seal, can be connected via a bayonet catch to a charging head, which also accommodates the charging socket.

The disadvantage with known solutions is that these need a large installation space in order to be able to compensate for tolerances. In addition, precisely in the connection by means of a bayonet catch, a rotational movement is always necessary, meaning that only round shapes are made possible. This is disadvantageous in particular in combination charging sockets which can be connected to different charging systems.

It is an object of the present invention to provide a charging connection element for connection to a charging apparatus which, with simpler and more economical production and mounting, has a smaller installation space.

The object is achieved by the features of the independent claim. The sub-claims contain preferred developments of the invention.

The object is thus achieved by a charging connection element of a vehicle. The charging connection element is used to connect to a charging apparatus. In this way, a battery of a vehicle can preferably be charged. This is advantageous in particular when the vehicle is an electric vehicle or a plug-in hybrid. The charging connection element comprises a charging socket and a sealing element. The charging socket is used to receive electrical connectors. For example, the charging socket can have a female connector and/or a male connector, which is provided for connection to the charging apparatus. The electrical connectors can preferably be connected to a battery of the vehicle, so that charging is made possible. The sealing element is provided to seal off the charging socket from other components of the vehicle. In particular, the sealing element is used to seal off the charging sockets from a body of the vehicle.

Particularly advantageously, provision is additionally made for compensation of tolerances between vehicle body and charging socket to be made possible by the sealing element. The charging socket advantageously has a first latching element. The sealing element advantageously has a second latching element. The first latching element and the second latching element can be latched relative to one another in a large number of different latching positions. As a result, detachment of the charging socket and sealing element can be prevented. Different distances between the charging socket and the sealing element are defined by the different latching positions. Thus, a connection between charging socket and sealing element can be produced simply and with little effort, in that the first latching element only has to be latched with the second latching element. As a result of the large number of different latching positions, it is in particular possible to compensate for tolerances, since the distance between charging socket and sealing element can be adjusted, wherein at the same time a firm connection between charging socket and sealing element is produced. In particular, provision is made for the charging socket and the sealing element to be connected to each other in a form-fitting manner by the latching of the first latching element and the second latching element.

Preferably, the first latching element is a latching lug and the second latching element is toothing. Alternatively, provision is made for the first latching element to have the toothing and the second latching element to have the latching lug. The latching lug can be latched in the toothing. Thus, a large number of different positions, at which the latching lug can be latched, are provided by the toothing. This leads to the previously described possibility of the large number of different latching positions. In addition, the latching lug and toothing can be aligned simply with one another, wherein it is possible in particular to arrange the latching lug simply and with little effort at different positions of the toothing.

The toothing preferably has a large number of teeth, wherein each tooth can be latched with the latching lug. Thus, a latching position is formed by each tooth. Thus, the number of latching positions can be set by the number of teeth. In addition, provision is preferably made for indexing of the distance between charging socket and sealing element to be adjustable by means of the distance of the teeth from one another. It is thus possible to define the accuracy with which the distance between charging socket and sealing element is adjustable. Thus, in particular, optimum compensation for tolerances can be achieved.

The toothing is advantageously arranged on a base surface of a groove. Provision is thus made for side walls of the groove to extend along the toothing. Advantageously, provision is made for the side walls of the groove to simultaneously be side faces of the toothing. The guidance of the latching lug is carried out by the side walls of the groove. In particular, provision is made for the latching lug to have such an extent that it can be guided by the two side walls of the groove. Thus, in particular, inadvertent detachment of latching lug and toothing is prevented. At the same time, the charging socket can be connected to the sealing element simply and with little effort by the latching lug and the toothing being latched.

The toothing is particularly advantageously saw-tooth toothing. Thus, in particular, a plug-and-latch system for fixing charging socket and sealing element can be implemented. This means that the latching of the first latching element and the second latching element, i.e. the latching of the latching lug on the toothing, can thus be adjusted by guiding the latching lug along the toothing. The latching lug can move along the toothing only in one direction because of the saw-tooth toothing. An opposed movement is no longer possible because of the latching. The latching lug is particularly advantageously likewise formed in the shape of a saw tooth. In this way, in particular the distance between charging socket and sealing element can be reduced but not enlarged again because of the latching. Thus, secure and reliable compensation for tolerances can be achieved.

The charging socket preferably has a cylindrical inner surface. The sealing element advantageously has a cylindrical outer surface. The cylindrical inner surface and the cylindrical outer surface in particular bear on one another, wherein the first latching element is attached to the cylindrical inner surface and the second latching element is attached to the cylindrical outer surface. The cylindrical shape can in particular comprise a round or an oval cross section. Thus, a secure and reliable connection can be achieved by simply sliding charging socket and sealing element into each other. Therefore, the charging connection element can be completed simply and with little effort.

Particularly advantageously, provision is made for a relative movement of the charging socket and sealing element at right angles to a central axis to be avoided as a result of the cylindrical inner surface bearing on the cylindrical outer surface. This firstly permits secure and reliable sealing of the sealing element; at the same time the completion of the charging connection element is simplified. For example, the first latching element and the second latching element merely have to act along one direction, which means along the direction of the central axis. At the same time, relative movement between the charging socket and sealing element is prevented by the inner surfaces and outer surfaces of charging socket and sealing element bearing on each other.

The charging socket advantageously has a sealing groove, in which a sealing lip of the sealing element engages. The sealing is thus secure and reliable. The sealing groove and the sealing lip are in particular formed circumferentially around the previously described central axis.

The sealing element advantageously has a lower modulus of elasticity than the charging socket. Thus, during the completion of the charging connection element, the sealing element is predominantly deformed. In addition, the sealing element can simply and with little effort effect compensation for tolerances relative to further components of the vehicle, for example to the vehicle body. The charging socket, on the other hand, serves as a rigid element to receive electrical connectors.

Finally, the invention relates to a vehicle. The vehicle comprises a charging connection element as previously described. Provision is made for the vehicle to be in particular an electric vehicle or a plug-in hybrid, wherein a battery of the vehicle can be charged via the charging connection element. The battery is in particular a high-voltage accumulator, via which an electric motor of the vehicle can be supplied with electrical energy.

Further details, features and advantages of the invention can be gathered from the following description and the figures.

DETAILED DESCRIPTION OF THE DRAWINGS

Figure 1:
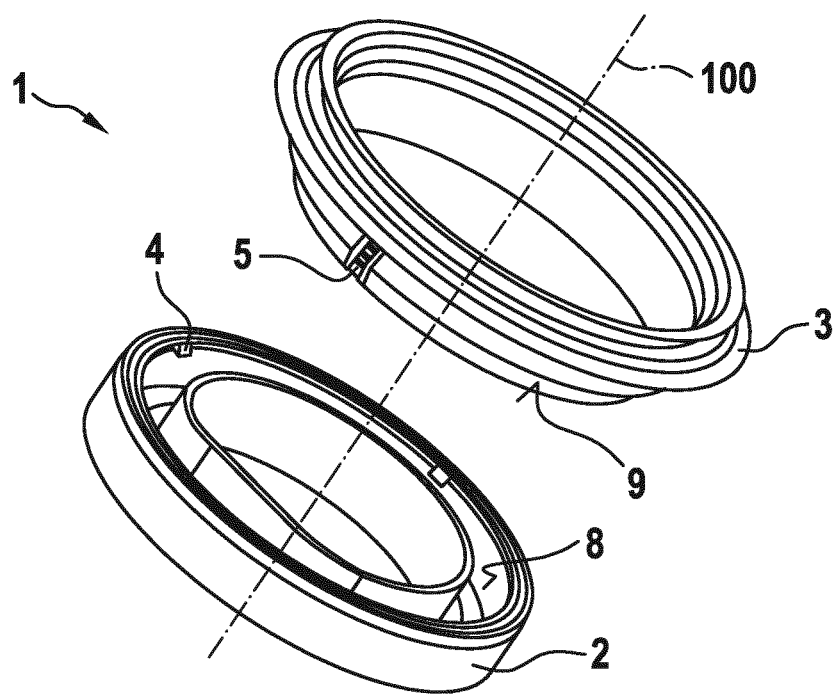
FIG. 1 is a schematic exploded illustration of a charging connection element of a vehicle according to an exemplary embodiment of the invention.
Figure 2:
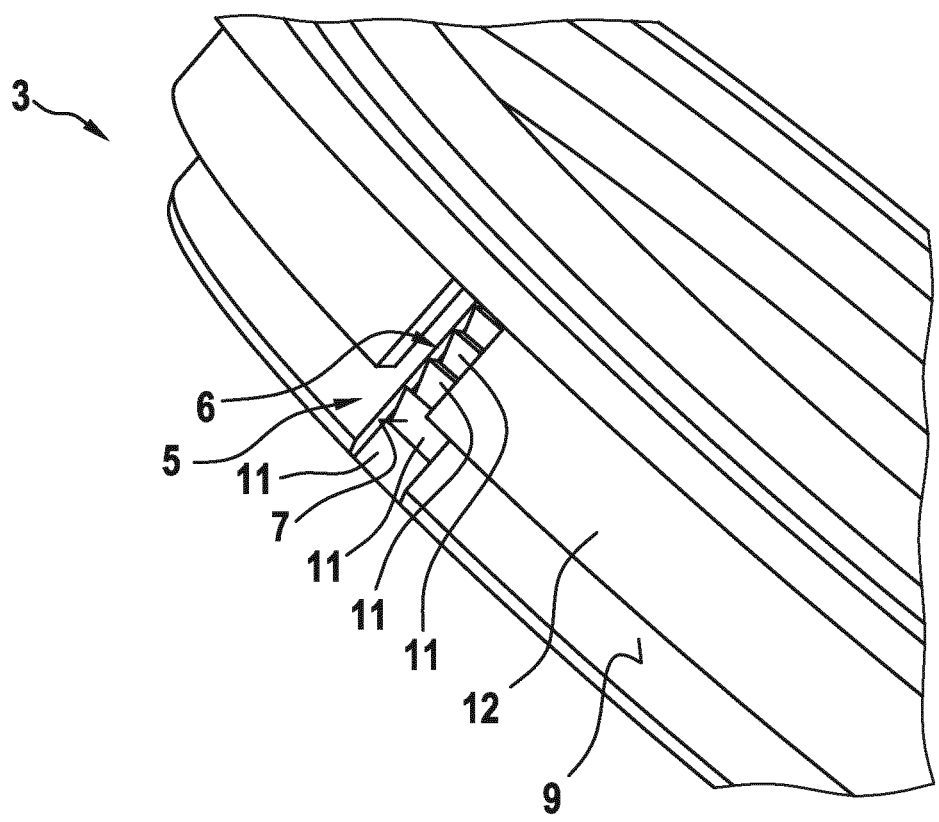
FIG. 2 is a schematic detailed view of the sealing element of the charging connection element of the vehicle according to the exemplary embodiment of the invention.
Figure 3:
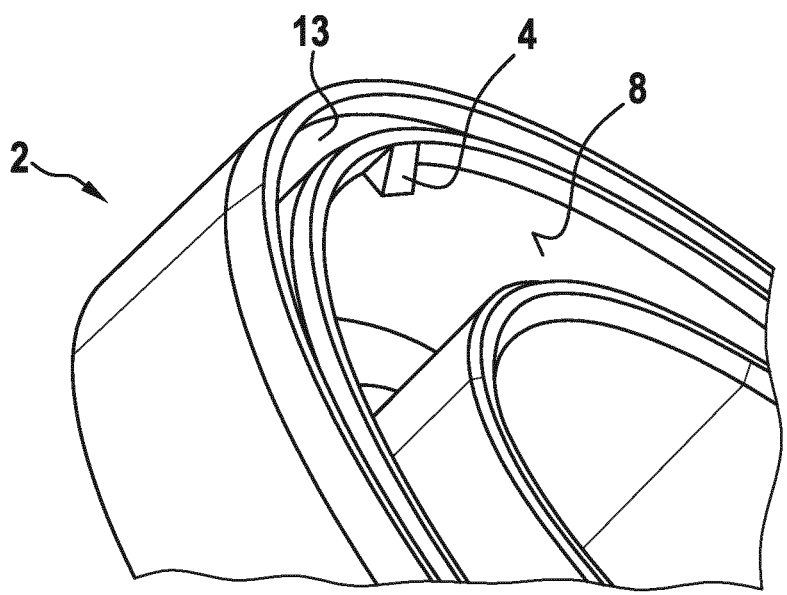
FIG. 3 is a schematic detailed view of the charging socket of the charging connection element of the vehicle according to the exemplary embodiment of the invention.
Figure 4:
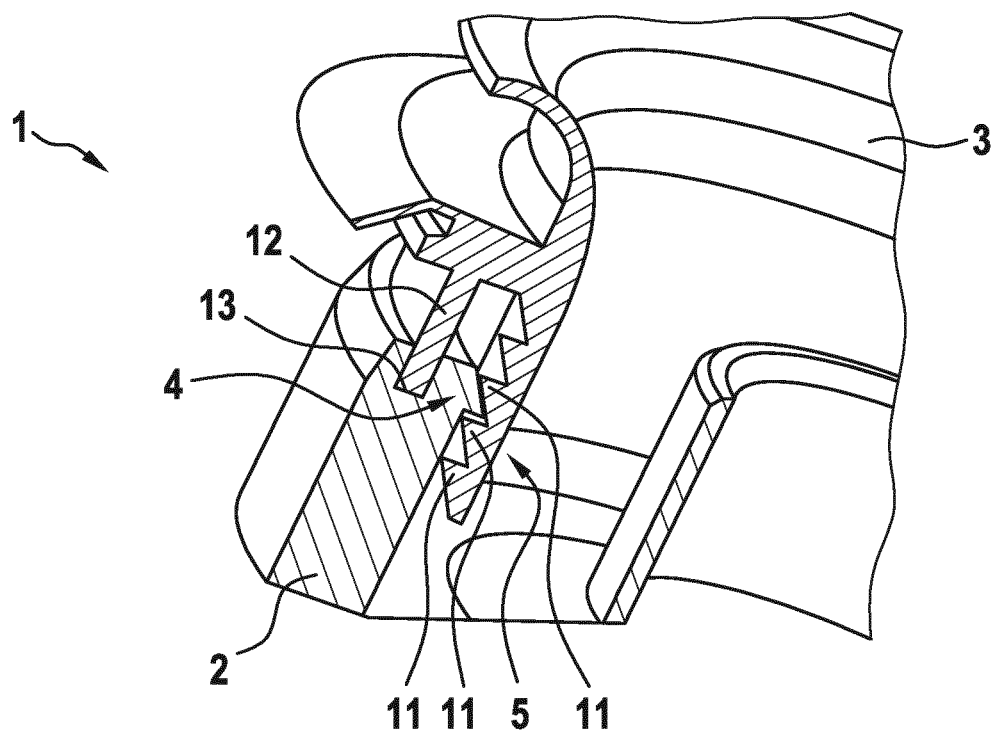
FIG. 4 is a schematic sectional view through the charging connection element of the vehicle according to the exemplary embodiment of the invention.

FIGS. 1 to 4 show, schematically, various views of a charging connection element 1 according to an exemplary embodiment of the invention, which comprises a charging socket 2 and a sealing element 3. Provision is made for the charging socket to be provided to receive electrical connectors 14 (cf. FIG. 5), wherein the sealing element 3 is provided to seal off the charging socket 2 from a body of a vehicle 10 accommodating the charging connection element (cf. FIG. 5). The sealing element 3 additionally advantageously serves to compensate for tolerances between the body of the vehicle 10 and the charging socket 2.

In order in particular to be able to carry out the aforesaid tolerance compensation, the charging socket has a first latching element 4. The sealing element comprises a second latching element 5. Provision is made for the first latching element 4 and the second latching element 5 to be capable of latching in each other. The latching can be carried out at different latching positions, wherein each latching position defines the different distance between the charging socket and sealing element.

The first latching element 4 is in particular a latching lug. The second latching element 5 is in particular toothing. The toothing comprises a large number of teeth 11, wherein the teeth 11 are preferably formed so as to be complementary to the latching lug of the first latching element 4. In particular, the teeth 11 have a saw-tooth shape.

The teeth 11 extend along a central axis 100 of the charging socket 2 and sealing element 3. Thus, in particular the distance along the central axis 100 between the charging socket 2 and sealing element 3 can be defined by the latching of the first latching element 4 and second latching element 5. A plug and latch system is implemented as a specific form of latching lug and/or toothing. This means that the distance between the charging socket 2 and the latching element 3 can always be reduced, since the latching lug of the first latching element 4 can alternate with that tooth 11 of the toothing of the second latching element 5 with which the latter engages. As a result of the saw-tooth shape, there is an oblique surface, on which the latching lug of the first latching element 4 can slide. In the opposite direction, on the other hand, a surface of the latching lug of the first latching element 4 rests parallel on the surface of the tooth 11 of the second latching element 5. Thus, relative movement between the charging socket 2 and sealing element 3 in this direction is prevented. The fact that only a reduction in the distance between the charging socket 2 and sealing element 3 is possible means that the latching of the first latching element 4 and second latching element 5 can be used to compensate for tolerances. Thus, the sealing element 3 is preferably fitted to the charging socket 2, wherein the first latching element 4 and the second latching element 5 latch by the latching lug interacting with one of the teeth 11. The sealing element 3 can then be pushed further onto the charging socket 2 until the sealing element 3 rests on a component of the vehicle 10, for example on a vehicle body. In particular the sealing element 3 has a lower modulus of elasticity than the charging socket 2. Thus, the sealing element 3 can be deformed elastically, as a result of which, in particular, clamping on account of elastic deformation is possible. Thus, play-free contact of the sealing element 3 on the further component, in particular on the vehicle body, and on the first latching element 4 of the charging socket 2 can be achieved. The large number of teeth 11 ensures that a latching position which effects the distance necessary for the clamping between the charging socket 2 and sealing element 3 is available.

The charging socket 2 and the sealing element 3 are advantageously substantially cylindrical and extend around the central axis 100. Provision is in particular made for the charging socket 2 to have a cylindrical inner surface 8 and for the sealing element to have a cylindrical outer surface 9. When the sealing element 3 and charging socket 2 are assembled, then in particular the cylindrical inner surface 8 is brought to bear on the cylindrical outer surface 9. As a result of such a contact, a movement of charging socket 2 and sealing element 3 relative to each other at right angles to the central axis 100 is prevented. As a result of the latching of the first latching element 4 and the second latching element 5, a relative movement of the charging socket 2 and sealing element 3 parallel to the central axis 100, at least in one direction, is additionally prevented. This one direction is in particular that direction in which the charging socket 2 and sealing element 3 would be detached from each other. By means of the first latching element 4, the second latching element 5, the cylindrical inner surface 8 and the cylindrical outer surface 9, it is thus advantageously possible to achieve a situation in which the charging socket 2 and sealing element 3 cannot move relative to each other.

The toothing of the second latching element 5 is in particular arranged on a base surface of a groove 6. The groove 6 in particular has side faces 7, wherein the teeth 11 extend between the two side faces 7 of the groove. In this way, it is in particular possible to achieve a situation in which there is a stop surface in the edge regions of the teeth 11. The latching lug of the first latching element 4 can thus be guided on the side faces 7 of the groove 6 in order always to be in contact with the teeth 11. In particular, it is not possible, by relative rotation about the central axis 100, to move the sealing element 3 into such an alignment relative to the charging socket 2 in which the first latching element 4 would be offset with respect to the circumferential direction around the central axis 100 relative to the second latching element 5. Thus, the charging connection element can be completed safely and reliably.

In order to permit optimal sealing, the charging socket 2 has a sealing groove 13. A sealing lip 12 of the sealing element 3 engages in the sealing groove 13. Thus, the charging socket 2 is sealed off from the further component, in particular the body, of the vehicle 10 by the sealing element 3.

Figure 5:
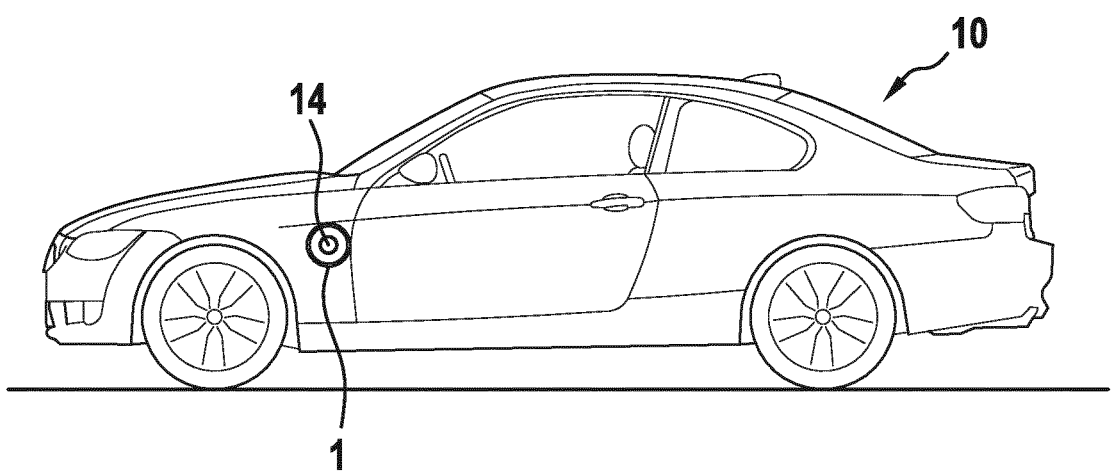
FIG. 5 is a schematic view of the vehicle according to an exemplary embodiment of the invention.

FIG. 5 shows, schematically, a vehicle 10 according to an exemplary embodiment of the invention. The vehicle 10 comprises a charging connection element 1 as described previously. The charging connection element 1 thus comprises a charging socket 2, which is sealed off from a body of the vehicle 10 by the sealing element 3. At the same time, the sealing element 3 constitutes a compensation for tolerances between the vehicle body and charging socket 2. The charging socket 2 has at least one electrical connector 14. Via the electrical connector 14, a charging apparatus can be attached to the charging connection element 1 and therefore to the vehicle 10.

The vehicle 10 is in particular an electric vehicle or a plug-in hybrid. A battery of the vehicle 10, which is provided to provide electrical energy for an electric drive motor and which in particular is a high-voltage accumulator, can thus be charged via the charging connection element 1. For this purpose, the aforesaid battery, in particular the high-voltage accumulator, has to be connected electrically to the at least one electrical connector 14 of the charging socket 2.

As a result of the simple configuration of the charging connection element 1, firstly the mounting of the charging connection element 1 on the vehicle 10 is simplified. In addition, an installation space required by the charging connection element 1 on the vehicle is reduced as compared with the prior art.

LIST OF DESIGNATIONS

1 Charging connection element
2 Charging socket
3 Sealing element
4 First latching element
5 Second latching element
6 Groove
7 Side wall
8 Cylindrical inner surface
9 Cylindrical outer surface
10 Vehicle
11 Tooth
12 Sealing lip
13 Sealing groove
14 Electrical connector
100 Central axis

What is claimed is:

1. A charging connection element of a vehicle, for connection to a charging apparatus, comprising:
    a charging socket for receiving electrical connectors, and
    a sealing element for sealing off the charging socket from other components of the vehicle,
    wherein the charging socket has a first latching element and the sealing element has a second latching element,
    wherein the first latching element and the second latching element are latchable relative to one another in a large number of different latching positions in order to prevent the charging socket and the sealing element from becoming detached,
    wherein the sealing element includes an annular sealing surface on a radially outer surface that is configured to engage an aperture in one of the other components of the vehicle, and
    wherein different distances between the charging socket and the sealing element are defined by the different latching positions.

2. The charging connection element according to claim 1, wherein
    the first latching element has a latching lug and the second latching element has toothing, or
    the first latching element has toothing and the second latching element has a latching lug,
    wherein the latching lug is latchable in the toothing.

3. The charging connection element according to claim 2, wherein
    the toothing has a large number of teeth,
    each tooth is latchable with the latching lug, and
    a latching position is formed by each tooth.

4. The charging connection element according to claim 2, wherein
    the toothing is arranged on a base surface of a groove, and
    side walls of the groove are designed to guide the latching lug.

5. The charging connection element according to claim 2, wherein
    the toothing is saw-tooth toothing.

6. The charging connection element according to claim 1, wherein
    the charging socket has a cylindrical inner surface and the sealing element has a cylindrical outer surface,
    the cylindrical inner surface and the cylindrical outer surface bear on one another, and
    the first latching element is attached to the cylindrical inner surface and the second latching element is attached to the cylindrical outer surface.

7. The charging connection element according to claim 6, wherein
- a relative movement of the charging socket and sealing element at right angles to a central axis of the cylindrical inner surface and cylindrical outer surface is avoided as a result of the cylindrical inner surface bearing on the cylindrical outer surface, and
- a relative movement of the charging socket and sealing element parallel to a central axis is prevented by the first latching element and the second latching element.

8. The charging connection element according to claim 1, wherein
- the charging socket has a sealing groove, in which a sealing lip of the sealing element engages.

9. The charging connection element according to claim 1, wherein
- the sealing element has a lower modulus of elasticity than the charging socket.

10. A vehicle comprising a charging connection element according to claim 1.

\* \* \* \* \*